United States Patent [19]

Piper

[11] 3,968,592

[45] July 13, 1976

[54] GAME CALLER HAVING DIAPHRAGM MEANS, MEGAPHONE AND BELLOWS

[75] Inventor: Frank R. Piper, Delmont, Pa.

[73] Assignee: Penn's Woods Products, Inc., Delmont, Pa.

[22] Filed: Aug. 23, 1974

[21] Appl. No.: 499,838

[52] U.S. Cl. .................................................. 46/178
[51] Int. Cl.² ....................... G10K 9/02; G10K 9/18
[58] Field of Search........... 46/178, 179, 180, 175 R, 46/181; 220/298, 299, 295, 293

[56] References Cited
UNITED STATES PATENTS

| 704,233 | 7/1902 | Brown | 46/181 |
|---|---|---|---|
| 1,203,967 | 11/1916 | Bowers | 46/180 |
| 1,843,128 | 2/1932 | Healy | 220/295 |
| 1,990,744 | 2/1935 | Merolle | 220/293 |
| 2,782,558 | 2/1957 | Harley | 46/180 |
| 2,813,811 | 6/1974 | Herter | 46/180 |
| 2,835,077 | 5/1958 | Mittelsteadt | 46/180 |
| 2,845,477 | 7/1958 | Kelley et al. | 220/298 X |
| 3,811,221 | 5/1974 | Wilt | 46/180 |
| 3,815,283 | 1/1973 | Piper | 46/180 |

FOREIGN PATENTS OR APPLICATIONS

| 767,476 | 9/1967 | Canada | 220/293 |
|---|---|---|---|
| 356,032 | 9/1961 | Switzerland | 220/293 |

*Primary Examiner*—F. Barry Shay
*Attorney, Agent, or Firm*—Brown, Murray, Flick & Peckham

[57] ABSTRACT

A game caller is shown including a diaphragm assembly that is vibrated in opposite directions by rapid bursts of air from a bellows. The only opening in the bellows is tubular and it is attached to one end of an elongated tubular housing where an end cap holds the diaphragm assembly onto the housing. The free end of the tubular housing permanently carries a cone-shaped megaphone forming a sound amplifier. A tubular cloth case has one end secured to the outer surface of the housing and the other end has a sewed pocket containing a drawstring. The case is utilized as a container for the bellows in a collapsed state for transporting the game caller. To prevent inadvertent operation, the closed end of the bellows may have an exhaust opening that is to be blocked during operation of the caller.

7 Claims, 5 Drawing Figures

U.S. Patent   July 13, 1976   3,968,592
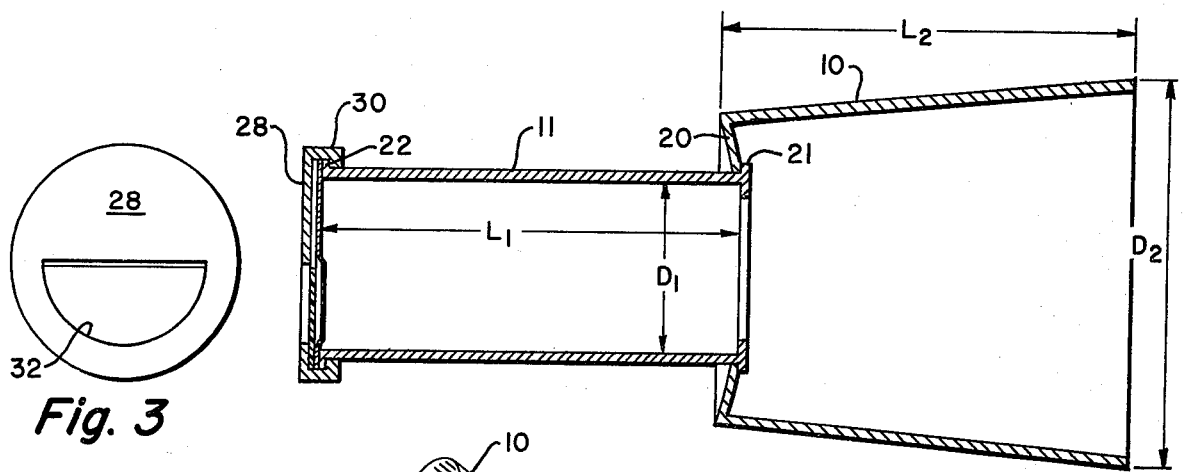
Fig. 3
Fig. 2
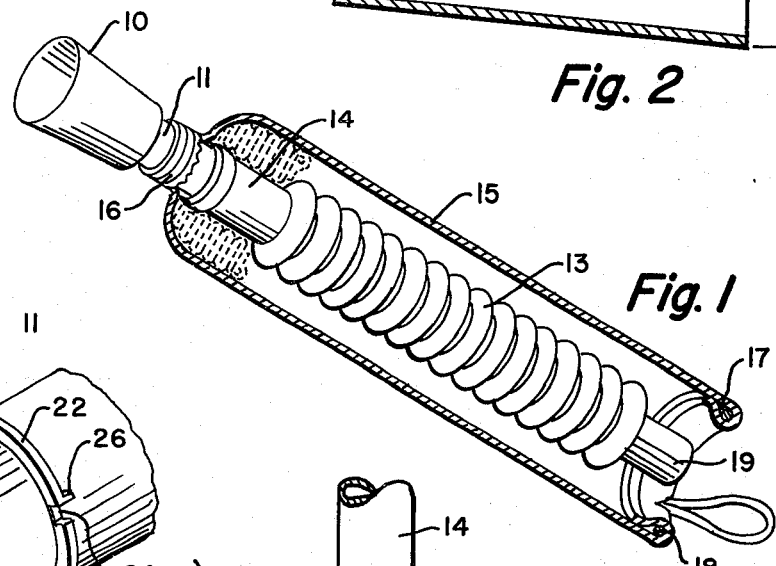
Fig. 1
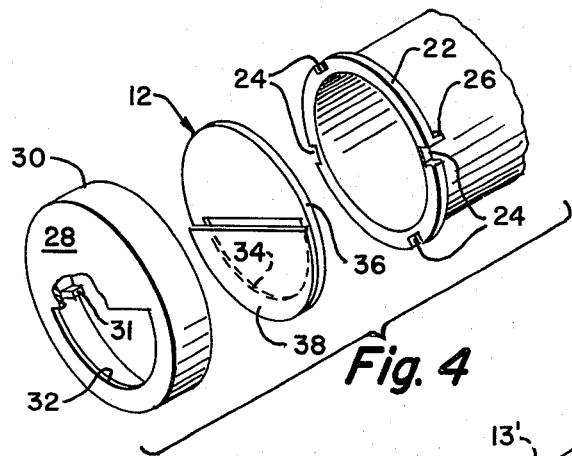
Fig. 4
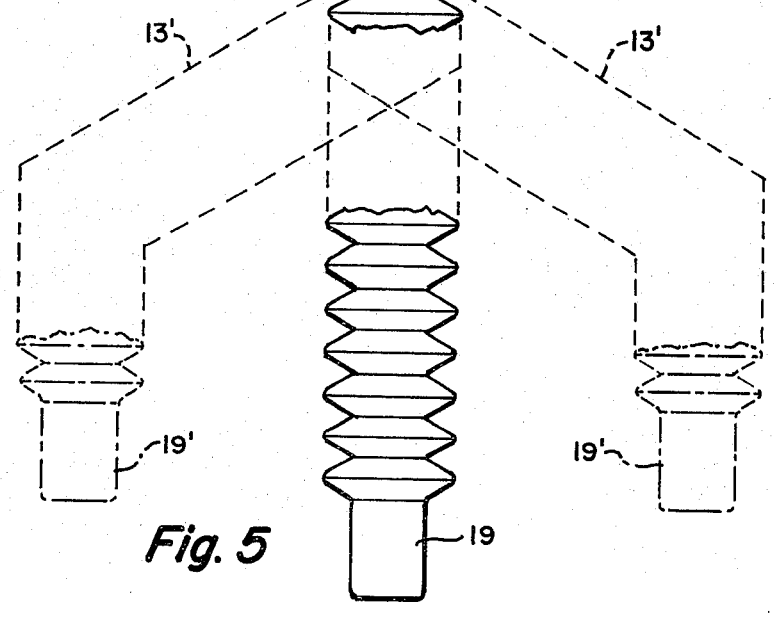
Fig. 5

GAME CALLER HAVING DIAPHRAGM MEANS, MEGAPHONE AND BELLOWS

BACKGROUND OF THE INVENTION

This invention relates to an improved game calling device for use by sportsmen while hunting wild game such as turkey. More particularly, the present invention relates to a game calling device particularly suited to simulate the rapid repeating sounds made by a turkey by providing a construction and arrangement of parts to vibrate a diaphragm at closely-spaced time intervals by bursts of air from a bellows.

The sounds made by wild turkeys, for example, are particularly difficult to simulate with a reasonable degree of faithfulness and realism. Thus, sportsmen have long sought an effective calling device to lure wild game into the vicinity of the hunter by a call device which can be operated effectively and without requiring great skill. The problem of achieving these results are compounded by the adverse conditions and terrain that usually prevail at natural environmental conditions to which the sportsmen must be adaptable. It is also an important attribute of game calling devices that they should be constructed in such a manner that they cannot be easily damaged or broken. In order to gain acceptance by sportsmen, the call device should be operable with equally successful results in varied weather conditions particularly inclement weather and at subfreezing temperatures.

In view of the foregoing needs and requirements for game calling devices, I have found that the many variations of game calling devices which are operated by sportsmen by blowing air through a mouthpiece to vibrate a reed member usually require a high degree of expertise. Even when the needed skills have been mastered by the sportsmen, there are still limitations which cannot be overcome particularly with regard to the control of the air delivered against the reed member of the call device. Specifically, there are severe limitations as to the air pressure, the frequency at which bursts of air can be delivered and the volume of air which can be reasonably expected to be delivered to the call device for sustained periods of time. I have, therefore, done away with the concept of providing a call device which is actuated and controlled by exhausting air from the mouth of a sportsman. This has the added advantage that moisture which is inherently accumulated in call devices when so actuated will be eliminated and thus doing away with the related problems and deteriorating effects upon the call device particularly the reed member.

SUMMARY OF THE INVENTION

It is an object of the present invention to provide an improved call device to simulate the sounds made by wild game wherein the call device is mechanically actuated and controlled so as to produce sounds including rapidly repeating sounds for long durations and sustained intervals.

It is a further object of the present invention to provide an improved game calling device to simulate the sounds made by wild game wherein the device is designed in such a way that it can be conveniently handled, carried and operated without damage to its parts.

It is another object of the present invention to provide a game calling device to simulate the sounds made by wild game in the form of a device which is held in the hands of a user and operated thereby without requiring great skill and expertise to produce resonance vibrations corresponding to the desired sounds.

According to the present invention, there is provided a game calling device comprising: a first housing, which may be tubular in shape, having a flange at one end thereof, an amplifier housing with progressively increasing diameter secured at the end having the smallest diameter to the first tubular housing, diaphragm means including a support plate for vibrating the column of air within the tubular housing, an end cap including means for releasably engaging the flange at the end of the tubular chamber to hold the diaphragm thereto, and an elongated tube of flexible and resilient material having a wall closing one end thereof and a tubular opening at the other end in communication with the diaphragm member for the passage of bursts of air to vibrate the diaphragm.

In the preferred form, the entire game calling device has a tubularly-shaped configuration with a truncated housing at one end of the tubular housing which has attached to its other end a tubularly-shaped bellows including spaced-apart and transverse annular ribs. The device of the present invention further includes a sleeve of cloth material attached at one end to the tubular housing and extending in an enclosing relation to the outer terminal end of the bellows. A pocket sewed into the free terminal end of the sleeve includes a drawstring to close the sleeve for mounting the bellows in a collapsed state.

These features and advantages of the present invention as well as others will be more fully understood when the following description is read in light of the accompanying drawings, in which:

FIG. 1 is a view in perspective of a game calling device embodying the features of the present invention;

FIG. 2 is a longitudinal sectional view of one end of FIG. 1;

FIG. 3 is an end view of FIG. 2;

FIG. 4 is an exploded view of the diaphragm assembly and associated parts; and

FIG. 5 is a view similar to FIG. 1 but illustrating by phantom-line positions the preferred manner of operating the game calling device according to the present invention.

In FIG. 1, the game calling device illustrated has the parts thereof particularly designed to simulate the sounds made by a wild turkey. This device, according to the present invention, essentially includes a sound amplifier in the form of a truncated cone 10 which is secured to one end of a tubular housing 11 and at the other end of the housing a diaphragm assembly 12 (FIG. 4) is releasably attached thereto. A bellows 13 has an open tubular collar 14 passed over the diaphragm assembly and received upon the tubular housing 11. A sleeve 15 made of cloth has one end passed over the bellows 13 beyond the collar 14 and secured by a clamp 16 to the outer surface of the housing 11. The free end of the sleeve 15 has a sewed pocket 17 containing a drawstring 18 with an external loop for closing the end of the sleeve. It is intended that the end of the sleeve will be enclosed by pulling the external loop of the string 18 after the bellows 13 including the closed tubular end 19 are totally received within the sleeve. In this way the bellows is held at a minimum length for transporting the calling device. Before the calling device can be actually used, the drawstring 18 should be loosened and that end of the sleeve pushed forward to expose the bellows 13.

FIGS. 2, 3 and 4 illustrate the details of the construction of the sound amplifier 10 and the tubular housing 11. As described above, the sound amplifier is a truncated cone 10. The length of the truncated portion is denoted in FIG. 2 as L2 and the largest diameter is denoted as D2. An end wall 20 opposite the free end of the cone has an opening which receives the tubular housing 11. The end wall 20 can be essentially eliminated by reducing the smallest diameter of the cone, if desired. The housing 11 has a segmented radial flange 21 passed through segmented openings in the end wall 20 into the area enclosed by the sound amplifier to form a support shoulder for welding or otherwise securing the end wall 20 to the tubular housing. The housing 11 and sound amplifier can be molded to form a one-piece assembly.

In FIG. 2, the length of the tubular housing 11 is denoted as L1 and the internal diameter thereof is denoted as D1. A radial flange 22 projects from the end of the tubular housing 11 opposite the flange 21. As best illustrated in FIG. 4, this flange has notched openings 24 at its quarter points and a stop member 26 in the form of an extending leg projecting toward the amplifier 10.

To simulate the sounds made by wild turkeys with a high degree of faithfulness and realism, I have discovered that certain details of the construction and relationship of parts just described are specifically important. In this regard, I have found that diameter D1 should equal approximately one-half diameter D2 and length L1 should approximately equal length L2. These relationships are such that diameter D1 equals approximately one-half length L1. I have employed in actual practice the following dimensions for these parts:

D1 = 1.25 inches
D2 = 2.5 inches
L1 = 2.875 inches
L2 = 2.75 inches

Of these relationship of dimensions of the parts, it is most important as far as I am aware that D1 should approximately equal one-half L1.

FIGS. 2, 3 and 4 illustrate an end cap 28 with a rim 30. The rim carries blocks 31 at its quarter points of the internal periphery such that these blocks can slide within the slots 24 and upon rotation of the end cap will be held by the flange 22 onto the housing 11. The stop member 26 limits the extent to which the end cap can be rotated. A semicircular opening 32 is formed in the end face surface of the cap 28. A similarly-shaped semicircular opening 34 is formed in a circular plate 36 that forms part of the diaphragm assembly 12. Overlying one face surface of the plate 36 is a diaphragm 38 attached thereto by a suitable adhesive. One edge of the diaphragm defines a straight and narrow slot with respect to the opening in the plate 36. This slot is provided to pass volumes of air in either direction with respect to the internal chamber of the tubular housing 11. The diaphragm 38 is preferably a thin flexible member, such as latex rubber, which has a thickness of between 0.006 inch and 0.008 inch.

The diaphragm assembly 12 is placed in its operative relation by positioning the diaphragm either against the flanged end of the tubular housing or within the end cap 30. In either event, the end cap 30 is placed on the tubular housing with the support blocks in registry with the slots 24. The end cap is then advanced further until the support blocks pass beyond the flange 22 and then the end cap is rotated in a clockwise direction to bring one of the blocks into engagement with a stop member 26.

In accordance with the present invention, I utilize a mechanical device to produce rapid bursts of air in a controlled manner to vibrate the diaphragm for producing sounds based on resonance vibrations to the column of air within the tubular housing 11. That is to say, in one instance, air is exhausted from the amplifier 10 to the atmosphere, and in the next instance, air is withdrawn from the atmosphere into the amplifier. I prefer to achieve these results by using a bellows to form a very resilient and flexible air chamber which can be rapidly moved in a direction approximately transverse to the axis of the bellows to displace the required volumes of air. The body portion of the bellows consists of a plurality of transverse angular ribs which enhance the restoring properties to the shape of the bellows.

While not shown in the drawing, it is desirable to provide an air exhaust opening in the end 19 of the bellows. This has the advantage of avoiding unwanted call sounds when compressing the bellows into the cloth carrying case and during transportation of the game caller by a sportsman. Such an air exhaust opening is easily blocked by pinching or otherwise elastically deforming the end 19 during actual operation of the game caller.

FIG. 5 illustrates a preferred mode of operation of the game calling device already described. In this regard, for the calling of turkey, for example, a rapid succession of sounds which will similate those made by turkeys is frequently characterized as a gobble, gobble. To achieve the repetitive nature of these sounds and the natural characteristic of the duration of each sound, I have found that by grasping with one hand the tubular housing 11 and grasping the closed end 19 of the bellows with the other hand and then elastically deforming the bellows as indicated by the phantom-line position 13'. This is accomplished by transversely moving its closed end 19 relative to the housing 11 to the phantom-line position 19'. A quick burst of air is produced when the closed end of the bellows is moved to a straight-line position. The motion is continued between the phantom line positions 19'. This movement of the bellows is characteristic of displacing the closed end 19 of the bellows into a Z-shaped configuration with the open end 14 and then moving the closed end of the bellows to the straight-line position and then beyond to a mirror image of a Z-shaped configuration. Not only is it easy to move the bellows in this manner, but also the results are amazingly successful in regard to the simulation of sounds made by wild turkey.

Gobble-like sounds produced by an apparatus according to the present invention were recorded with a cassette-type tape recorder in the outside environment. The recordings were processed through a sonagraph using a wide band-pass filter and FL-1 circuit to obtain voice prints. The major band of energy from the call during the test was found to lie in the range of 50 to 150 kilohertz. Each call had a duration of 200 milliseconds. The call sounds had a good clear quality from 20 yards to at least 50 yards. Some distortion was observed at ranges of less than 10 yards. Recordings were made while the call was facing away from and then facing toward the recorder. The clarity was found to be equally good in both instances particularly at a range of 20 to 50 yards.

The voice prints demonstrated that the clarity was best at 50 yards and it is thought that the call will perform better at greater distances beyond 50 yards. The voice prints were found to be quite similar to voice prints made of actual sounds of turkeys.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A game calling device to simulate the sounds made by wild game, said device comprising:

a first housing having a flange at one end thereof, a truncated conical megaphone housing secured at the end thereof having the smallest diameter to the other end of said first housing with the interiors of said housings in communication, a support plate having an opening therethrough, diaphragm means for producing vibrations in the column of air which lies within said first housing, said diaphragm means being carried by said support plate in an overlying relation with said opening, an edge of said diaphragm means forming a narrow slot with an edge in the opening, an end cap including a rim with means projecting from the periphery thereof for releasably engaging the flange at one end of said first housing, said end cap receiving and holding said diaphragm means on the flanged end of said first housing, and an elongated flexible and resilient bellows having a wall at one end thereof with an exhaust opening therein adapted to be closed by elastic deformation for producing bursts of air, said bellows being secured at its other end in open communication with said first housing for the passage of the bursts of air into said first housing to vibrate said diaphragm means.

2. The device according to claim 1 further comprising a sleeve of flexible material attached at one end to an outer peripheral surface of said first housing, with said first housing being tubular in shape, said sleeve including means for selectively closing the free end of said sleeve to enclose said flexible and resilient member within said sleeve.

3. The device according to claim 2 further comprising means for securing said sleeve of flexible material onto the outer peripheral surface of said first housing.

4. The device according to claim 1 further comprising a sleeve of cloth material attached at one end to the outer peripheral surface of said first housing, said sleeve including a sewed pocket at the free end thereof, and means within said pocket for selectively closing the free end of said sleeve to enclose said flexible and resilient member within said sleeve.

5. The device according to claim 1 wherein the length of said first housing is approximately twice the diameter thereof.

6. The device according to claim 5 wherein said truncated conical megaphone housing has a length approximately equal to the length of said first housing.

7. The device according to claim 1 wherein the flange at one end of said first housing extends radially beyond the outer peripheral surface thereof and defines notched openings at the quarter points of its periphery, said device further including stop means supported by said flange, and a block carried by said end cap at the quarter points about the periphery thereof to pass through the notched openings in said flange and engage said stop means.

* * * * *